(12) United States Patent
Yamaoka

(10) Patent No.: US 9,809,251 B2
(45) Date of Patent: Nov. 7, 2017

(54) LANE FOLLOWING CONTROL DEVICE

(71) Applicant: TOYOTA JIDOSHA KABUSHIKI KAISHA, Toyota-shi, Aichi (JP)

(72) Inventor: Masaaki Yamaoka, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 33 days.

(21) Appl. No.: 14/972,666

(22) Filed: Dec. 17, 2015

(65) Prior Publication Data

US 2016/0221604 A1    Aug. 4, 2016

(30) Foreign Application Priority Data

Jan. 29, 2015    (JP) ................. 2015-015230

(51) Int. Cl.
*B62D 15/02* (2006.01)
(52) U.S. Cl.
CPC ................. *B62D 15/025* (2013.01)
(58) Field of Classification Search
CPC .................................... B62D 15/025
See application file for complete search history.

(56) References Cited

U.S. PATENT DOCUMENTS

| | | | |
|---|---|---|---|
| 7,698,032 B2 * | 4/2010 | Matsumoto | B60T 8/17557 180/170 |
| 7,742,864 B2 * | 6/2010 | Sekiguchi | B60K 31/0008 180/169 |
| 2005/0228588 A1 | 10/2005 | Braeuchle et al. | |
| 2007/0233343 A1 * | 10/2007 | Saito | B62D 1/28 701/41 |
| 2007/0233386 A1 * | 10/2007 | Saito | B62D 15/025 701/300 |
| 2008/0211261 A1 * | 9/2008 | Wegener | B60T 1/16 296/180.5 |
| 2009/0005933 A1 * | 1/2009 | Tabata | B60T 8/17557 701/42 |
| 2009/0125204 A1 * | 5/2009 | Kudo | B62D 15/026 701/96 |
| 2010/0211235 A1 * | 8/2010 | Taguchi | B60T 7/22 701/1 |
| 2010/0250065 A1 * | 9/2010 | Kelly | B60G 17/016 701/37 |

(Continued)

FOREIGN PATENT DOCUMENTS

| | | |
|---|---|---|
| JP | 2006-321299 A | 11/2006 |
| JP | 4005597 B2 | 11/2007 |

*Primary Examiner* — Frederick Brushaber
(74) *Attorney, Agent, or Firm* — Sughrue Mion, PLLC

(57) ABSTRACT

Provided is a lane following control device in which an uncomfortable feeling of a driver can be suppressed.
In a case where shift processing is performed on a first adjacent vehicle X1, and when a distance between a second adjacent vehicle X2 travelling immediately front of the first adjacent vehicle X1 and the first adjacent vehicle X1 is equal to or less than a vehicle-to-vehicle distance threshold value and a lane width direction distance between the second adjacent vehicle X2 and a travelling lane R1 of the host vehicle V is equal to or less than a lane width direction threshold value, a target lateral position setting unit 14 maintains the shift processing on the first adjacent vehicle X1 until the shift processing is performed on the second adjacent vehicle X2.

5 Claims, 7 Drawing Sheets

(56) References Cited

U.S. PATENT DOCUMENTS

| | | | |
|---|---|---|---|
| 2010/0283632 A1* | 11/2010 | Kawabata | G08G 1/166 340/932.2 |
| 2011/0022317 A1* | 1/2011 | Okita | B60W 30/12 701/301 |
| 2012/0123613 A1* | 5/2012 | Waki | G08G 1/167 701/1 |
| 2013/0226406 A1* | 8/2013 | Ueda | B62D 1/28 701/41 |
| 2014/0180543 A1* | 6/2014 | Ueda | B62D 15/025 701/41 |

* cited by examiner

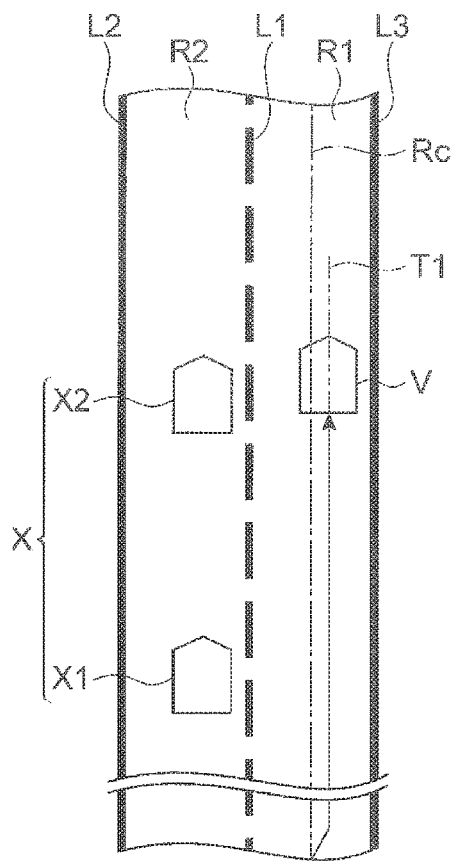 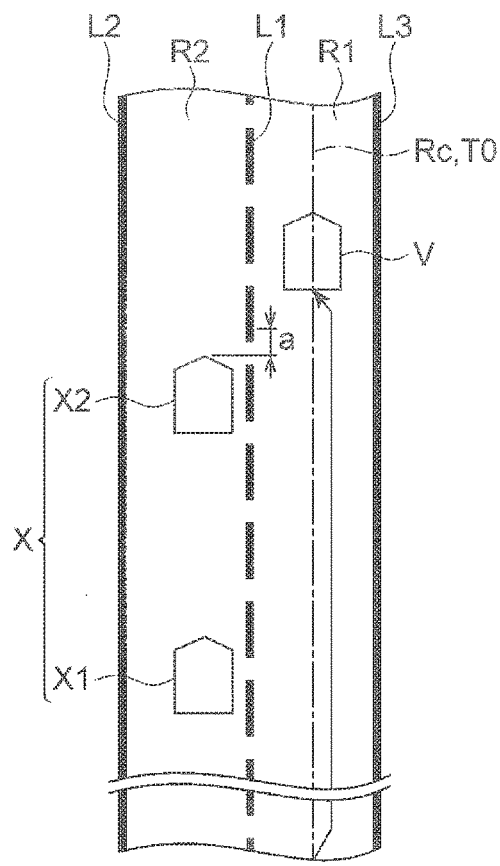
*Fig.3A*  *Fig.3B*

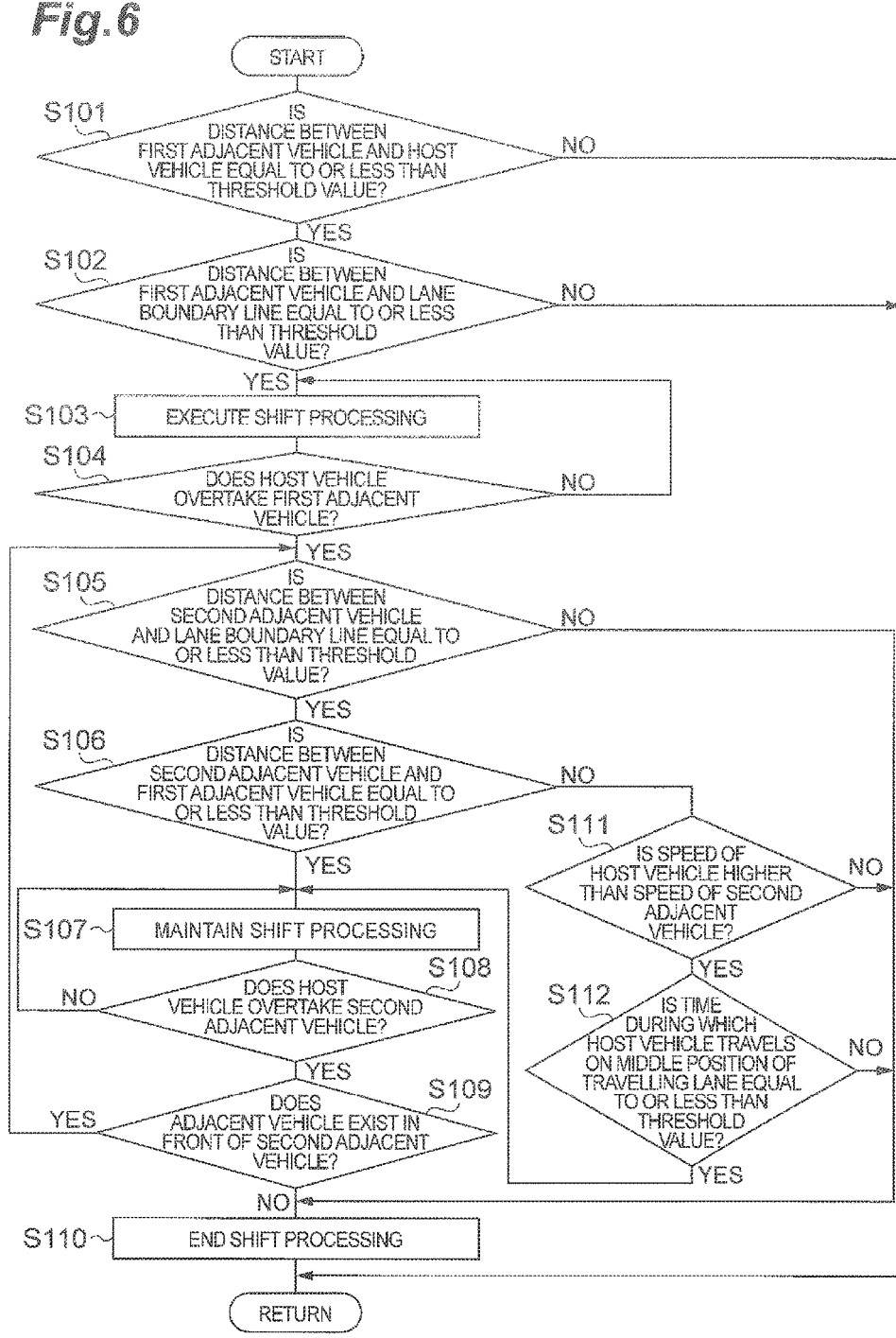

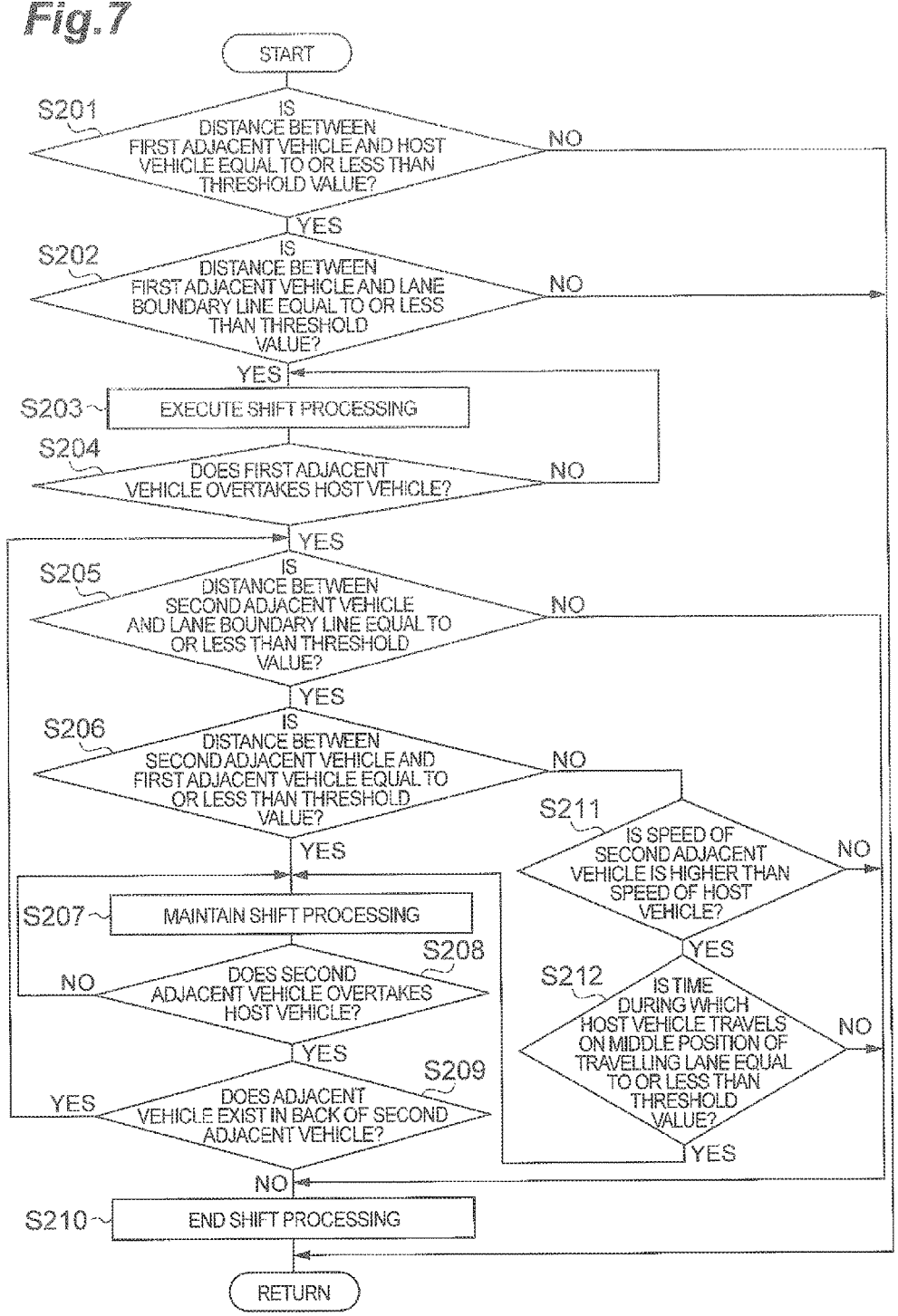

LANE FOLLOWING CONTROL DEVICE

TECHNICAL FIELD

An aspect of the present invention relates to a lane following control device.

BACKGROUND

There is a lane following control device which is configured to control the travelling of a host vehicle so as to travel on middle position of a travelling lane. In addition, when controlling the travelling of the host vehicle so as to travel in the middle position of the travelling lane, in a case where an adjacent vehicle travelling in an adjacent lane is travelling in a position close to the travelling lane of the host vehicle, the lane following control device shifts a target lateral position of the host vehicle from the middle position so as to be separated from the adjacent lane at a distance in a lane width direction. Such a lane following control device is disclosed in, for example, Japanese Patent No. 4005597.

SUMMARY

In a case where a plurality of adjacent vehicles is travelling on an adjacent lane, after shifted target lateral position is returned to the middle position of the travelling lane, depending on intervals between the adjacent vehicles, there is a case where the above-described lane following control device shifts the target lateral position to the same direction again. In this case, a driver of the host vehicle feels that the host vehicle is travelling in a zigzag and thus, feels uncomfortable.

Therefore, an object in this technical field is to provide a lane following control device in which the uncomfortable feeling of the driver can be suppressed.

According to an aspect of the present invention, there is provided a lane following control device configured to control a travelling of a host vehicle such that the lateral position of the host vehicle becomes a target lateral position which is set at a middle position of a travelling lane, the device including an adjacent vehicle detection unit configured to detect an adjacent vehicle travelling on an adjacent lane which is adjacent to the travelling lane of the host vehicle, a shifting unit configured to perform shift processing for shifting the target lateral position in the travelling lane from a middle position so as to be separated from the adjacent lane in a case where a travelling direction distance between the adjacent vehicle detected by the adjacent vehicle detection unit and the host vehicle is equal to or less than a travelling direction threshold value and in a case where a lane width direction distance between the adjacent vehicle detected by the adjacent vehicle detection unit and the travelling lane of the host vehicle is equal to or less than a lane width direction threshold value, and a control unit configured to control the travelling of the host vehicle according to the target lateral position, in which, in a case where the shift processing is performed on a first adjacent vehicle which is closest to the host vehicle among the adjacent vehicles detected by the adjacent vehicle detection unit and travelling in front of the host vehicle, and when a distance between a second adjacent vehicle travelling immediately front of the first adjacent vehicle in the adjacent lane and the first adjacent vehicle is equal to or less than a vehicle-to-vehicle distance threshold value and when a lane width direction distance between the second adjacent vehicle and the travelling lane of the host vehicle is equal to or less than the lane width direction threshold value, the shifting unit maintains the shift processing on the first adjacent vehicle until the shift processing is performed on the second adjacent vehicle.

In the state in which the first adjacent vehicle and the second adjacent vehicle are travelling in the adjacent lane and in a case where the shift processing is performed on the first adjacent vehicle, and when the distance between the second adjacent vehicle and the first adjacent vehicle is equal to or less than the vehicle-to-vehicle distance threshold value and the lane width direction distance between the second adjacent vehicle and the travelling lane of the host vehicle is equal to or less than the lane width direction threshold value, the lane following control device maintains the shift processing on the first adjacent vehicle until the shift processing is performed on the second adjacent vehicle. That is, even when the host vehicle overtakes the first adjacent vehicle and the travelling direction distance between the host vehicle and the first adjacent vehicle exceeds the travelling direction threshold value, the lane following control device does not return the target lateral position to the middle position. In this way, during the time from the shift processing performed on the first adjacent vehicle to the shift processing performed on the second adjacent vehicle, the target lateral position of the host vehicle is not returned to the middle position. Therefore, the lane following control device can suppress the lateral movement of the host vehicle due to the returning of the target lateral position to the middle position. Therefore, it is possible to suppress the uncomfortable feeling of the driver.

In a case where the shift processing is performed on the first adjacent vehicle, and in a case where a distance between the second adjacent vehicle and the first adjacent vehicle is greater than the vehicle-to-vehicle distance threshold value and a lane width direction distance between the second adjacent vehicle and the travelling lane of the host vehicle is equal to or less than the lane width direction threshold value and a speed of the host vehicle is higher than a speed of the second adjacent vehicle, the shifting unit may calculate a relative speed between the host vehicle and the second adjacent vehicle, a relative distance between the host vehicle and the second adjacent vehicle, and a middle position travelling time which is a duration from the time when the shift processing on the first adjacent vehicle ends and the host vehicle is returned to the middle position to the time when the host vehicle is separated again from the middle position by the shift processing being performed on the second adjacent vehicle, and in which, when the relative speed is greater than a relative speed threshold value, the relative distance is equal to or less than a relative distance threshold value, or the middle position travelling time is equal to or less than a travelling time threshold value, the shifting unit may maintain the shift processing on the first adjacent vehicle until the shift processing is performed on the second adjacent vehicle.

The case where the relative speed is greater than the relative speed threshold value, the case where the relative distance is equal to or less than the relative distance threshold value, or the case where the middle position travelling time is equal to or less than the travelling time threshold value mean a case where, after the shift processing on the first adjacent vehicle and the lateral position of the host vehicle returns to the middle position after a short time is elapsed, the shift processing on the second adjacent vehicle needs to be executed again. For this reason, even when the distance between the second adjacent vehicle and the first adjacent vehicle is greater than vehicle-to-vehicle distance threshold value, the shifting unit maintains the shift processing on the first adjacent vehicle until the shift processing is performed on the second adjacent vehicle when the relative speed is greater than the relative speed threshold value, when the relative distance is equal to or less than the relative distance threshold value, and when the middle position travelling time is equal to or less than the travelling time threshold value. In this way, the lane following control device can further suppress the lateral movement of the host vehicle due to the returning of the target lateral position to the middle position. Therefore, it is possible to further suppress the uncomfortable feeling of the driver.

According to another aspect of the present invention, there is provided a lane following control device configured to control a travelling of a host vehicle such that the lateral position of the host vehicle becomes a target lateral position which is set at a middle position of a travelling lane, the device including an adjacent vehicle detection unit configured to detect an adjacent vehicle travelling on an adjacent lane which is adjacent to the travelling lane of the host vehicle, a shifting unit configured to perform shift processing for shifting the target lateral position in the travelling lane from a middle position so as to be separated from the adjacent lane in a case where a travelling direction distance between the adjacent vehicle detected by the adjacent vehicle detection unit and the host vehicle is equal to or less than a travelling direction threshold value and in a case where a lane width direction distance between the adjacent vehicle detected by the adjacent vehicle detection unit and the travelling lane of the host vehicle is equal to or less than a lane width direction threshold value, and a control unit configured to control the travelling of the host vehicle according to the target lateral position, in which, in a case where the shift processing is performed on a first adjacent vehicle which is closest to the host vehicle among the adjacent vehicles detected by the adjacent vehicle detection unit and travelling behind the host vehicle, and when a distance between a second adjacent vehicle travelling immediately behind the first adjacent vehicle in the adjacent lane and the first adjacent vehicle is equal to or less than a vehicle-to-vehicle distance threshold value and when a lane width direction distance between the second adjacent vehicle and the travelling lane of the host vehicle is equal to or less than the lane width direction threshold value, the shifting unit maintains the shift processing on the first adjacent vehicle until the shift processing is performed on the second adjacent vehicle.

In the state in which the first adjacent vehicle and the second adjacent vehicle are travelling in the adjacent lane and in a case where the shift processing is performed on the first adjacent vehicle, when the distance between the second adjacent vehicle and the first adjacent vehicle is equal to or less than the vehicle-to-vehicle distance threshold value and when the lane width direction distance between the second adjacent vehicle and the travelling lane of the host vehicle is equal to or less than the lane width direction threshold value, the lane following control device maintains the shift processing on the first adjacent vehicle until the shift processing is performed on the second adjacent vehicle. That is, even when the host vehicle is overtaken by the first adjacent vehicle and the travelling direction distance between the host vehicle and the first adjacent vehicle exceeds the travelling direction threshold value, the lane following control device does not return the target lateral position to the middle position. In this way, during the time from the shift processing performed on the first adjacent vehicle to the shift processing performed on the second adjacent vehicle, the target lateral position of the host vehicle is not returned to the middle position. Therefore, the lane following control device can suppress the lateral movement of the host vehicle due to the returning of the target lateral position to the middle position, and thus, it is possible to suppress the uncomfortable feeling of the driver.

In a case where the shift processing is performed on the first adjacent vehicle, and in a case where a distance between the second adjacent vehicle and the first adjacent vehicle is greater than the vehicle-to-vehicle distance threshold value and a lane width direction distance between the second adjacent vehicle and the travelling lane of the host vehicle is equal to or less than the lane width direction threshold value and a speed of the host vehicle is lower than a speed of the second adjacent vehicle, the shifting unit may calculate a relative speed between the host vehicle and the second adjacent vehicle, a relative distance between the host vehicle and the second adjacent vehicle, and a middle position travelling time which is a duration from the time when the shift processing on the first adjacent vehicle ends and the host vehicle is returned to the middle position to the time when the host vehicle is separated again from the middle position by the shift processing being performed on the second adjacent vehicle, and in which, when the relative speed is greater than a relative speed threshold value, the relative distance is equal to or less than a relative distance threshold value, or the middle position travelling time is equal to or less than a travelling time threshold value, the shifting unit may maintain the shift processing on the first adjacent vehicle until the shift processing is performed on the second adjacent vehicle.

The case where the relative speed is greater than the relative speed threshold value, the case where the relative distance is equal to or less than the relative distance threshold value, and the case where the middle position travelling time is equal to or less than the travelling time threshold value mean a case where, after the shift processing on the first adjacent vehicle and the lateral position of the host vehicle returns to the middle position after a short time is elapsed, the shift processing on the second adjacent vehicle needs to be executed again. For this reason, even when the distance between the second adjacent vehicle and the first adjacent vehicle is greater than vehicle-to-vehicle distance threshold value, the shifting unit maintains the shift processing on the first adjacent vehicle until the shift processing is performed on the second adjacent vehicle when the relative speed is greater than the relative speed threshold value, when the relative distance is equal to or less than the relative distance threshold value, and when the middle position travelling time is equal to or less than the travelling time threshold value. In this way, the lane following control device can further suppress the lateral movement of the host vehicle due to the returning of the target lateral position to the middle position. Therefore, it is possible to further suppress the uncomfortable feeling of the driver.

As the relative speed between the host vehicle and the second adjacent vehicle is greater, the vehicle-to-vehicle distance threshold value may be set to be greater. In a case where the relative speed between the host vehicle and the second adjacent vehicle is large, the host vehicle and the second adjacent vehicle approach each other in a short time. By setting the vehicle-to-vehicle distance threshold value to be large as the relative speed between the host vehicle and the second adjacent vehicle is greater, it becomes easy to execute the processing of maintaining the shift processing on the first adjacent vehicle until the shift processing is performed on the second adjacent vehicle. In this way, the lane following control device can further suppress the movement of the host vehicle in the lane width direction due to the returning of the target lateral position to the middle position. Therefore, it is possible to further suppress the uncomfortable feeling of the driver.

According to various aspects of the present invention, a lane following control device in which the uncomfortable feeling of the driver can be suppressed can be provided.

BRIEF DESCRIPTION OF THE DRAWINGS

FIGS. 3A and 3B are plan views for illustrating a setting of a target lateral position in a case where a host vehicle is overtaking an adjacent vehicle when a lane keeping is assisted.

FIG. 6 is a flowchart illustrating a flow of setting processing of a target lateral position in a case where a host vehicle is overtaking an adjacent vehicle.

FIG. 7 is a flowchart illustrating a flow of setting processing of a target lateral position in a case where an adjacent vehicle is overtaking a host vehicle.

DETAILED DESCRIPTION

Hereinafter, embodiments of the present invention will be described with reference to the drawings. In the description of the drawings, the same reference signs will be given to the same or corresponding elements and the description thereof will not be repeated.

Figure 1:
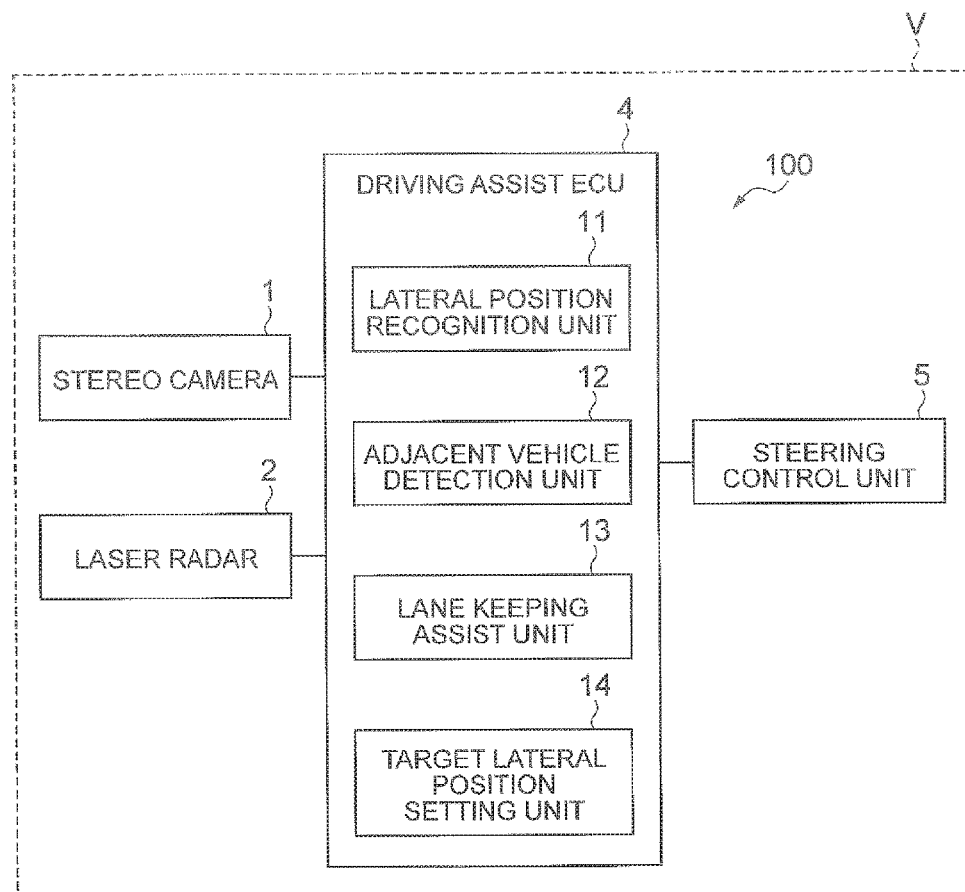
FIG. 1 is a diagram illustrating a schematic configuration of a lane following control device in an embodiment.

A lane following control device 100 illustrated in FIG. 1 is mounted on a host vehicle V such as a passenger car and assists the driving of the host vehicle V by a driver. The lane following control device 100 performs a lane keeping assist (LKA) as the driving assist.

The lane keeping assist in the present embodiment is a driving assist for controlling the vehicle such that a lateral position of the vehicle becomes a target lateral position in a travelling lane and causing the steering by the driver of the vehicle to be reflected on the travelling of the vehicle. The travelling lane is a lane in which the vehicle is travelling. The lateral position of the vehicle is a position of the vehicle in a width direction of the travelling lane. The lateral position of the vehicle is recognized based on, for example, a position of the center of the vehicle in a plan view as the reference. Hereinafter, the width direction of the travelling lane will be referred to as a lane width direction. The target lateral position is a position of the controlling target of the vehicle during the lane keeping assist. The target lateral position in the present embodiment is set in the middle position of the travelling lane in the lane width direction.

The lane following control device 100 recognizes, for example, two lane lines (for example, a lane boundary line or a road traffic zone boundary line) that forms the travelling lane using a vehicle-mounted camera, and sets the target lateral position for the lane keeping assist with a position equidistant from the two lane lines in the lane width direction as the middle position of the travelling lane. In addition, the lane following control device 100 recognizes the lateral position of the host vehicle V, for example, from the positions of the two lane lines in an image captured by the vehicle-mounted camera. The lane following control device 100 assists the travelling of the host vehicle V along the travelling lane by giving a steering torque to the host vehicle V such that the lateral position of the host vehicle V becomes the target lateral position. The lane following control device 100 gives the steering torque to a steering device of the host vehicle V by controlling, for example, a steering actuator of the host vehicle V.

In addition, in a case where an adjacent vehicle travelling on an adjacent lane is travelling in a position close to the travelling lane of the host vehicle V, the lane following control device 100 shifts the target lateral position of the host vehicle V from the middle position of the travelling lane so as to be separated from the adjacent vehicle at a distance in a lane width direction. The adjacent lane is a lane adjacent to the travelling lane of the host vehicle V via the lane boundary line.

Here, FIGS. 2A to 2C, FIGS. 3A and 3B are plan views for illustrating a setting of the target lateral position in a case where the host vehicle V is overtaking an adjacent vehicle when the lane keeping is assisted. R1 illustrated in FIG. 2A and the like are travelling lanes on which the host vehicle V travels. R2 is an adjacent lane adjacent to the travelling lane R1. L1 is a lane line which is a boundary line (lane boundary line) between the travelling lane R1 and the adjacent lane R2. L2 is a lane line (traffic zone boundary line) of the adjacent lane R2 at the opposite side of the lane boundary line L1. L3 is a lane line (center line) of the travelling lane R1 at the opposite side of the lane boundary line L1. Rc is a virtual line indicating the middle position of the travelling lane R1 in the lane width direction. T0 is an initial target lateral position in the lane keeping assist. The initial target lateral position is a target lateral position that is automatically set according to the travelling lane R1 when the lane keeping assist is started. Here, the initial target lateral position T0 is coincident with the middle position Rc of the travelling lane R1. X is an adjacent vehicle which travels in the adjacent lane R2. Among the adjacent vehicles X, the adjacent vehicle that travels on the position closest to the host vehicle V is referred to as a first adjacent vehicle X1 and the adjacent vehicle that travels on the position second closest to the host vehicle V is referred to as a second adjacent vehicle X2. T1 illustrated in FIG. 2B and the like is a changed target lateral position in which the initial target lateral position T0 is shifted in the lane width direction according to the position of the adjacent vehicle X travelling in the adjacent lane R2.

Hereinafter, the configuration of the lane following control device 100 will be described. The lane following control device 100 includes stereo camera 1, laser radar 2, a driving assist electronic control unit (ECU) 4, and a steering control unit 5.

The stereo camera 1 are provided on, for example, each of the back surfaces of the windshield and rear glass of the host vehicle V. The stereo camera 1 provided on the windshield glass of the host vehicle V has two imaging units. The two imaging units are disposed in a line in the vehicle width direction of the host vehicle V and image the front of the host vehicle V. Similarly, the stereo camera 1 provided on the rear glass of the host vehicle V has two imaging units. The two imaging units are disposed in a line in the vehicle width direction of the host vehicle V and image the backside of the host vehicle V. The stereo camera 1 transmit image information on the front and backside of the host vehicle V to the driving assist ECU 4. Instead of the stereo camera 1, monocular cameras may be used.

The laser radars 2 are provided, for example, on the front end and the rear end of the host vehicle V and detect obstacles (another vehicle, a pedestrian, a building, or the like) in the front and the backside of the host vehicle V using the laser. The laser radars 2 detect the obstacles by, for example, transmitting the laser to the front and backside of the host vehicle V and receiving the laser reflected from the obstacles such as another vehicle. The laser radars 2 transmit detected obstacle information to the driving assist ECU 4. Instead of the laser radars 2, millimeter wave radars may be used.

The steering control unit 5 is an electronic control unit that controls an electric power steering (EPS) system of the host vehicle V. The steering control unit 5 controls the steering torque of the host vehicle V by driving the steering actuator in the electric power steering system, which controls the steering torque of the host vehicle V. The steering control unit 5 controls the steering torque according to a control signal from the driving assist ECU 4.

The driving assist ECU 4 performs the control relating to the drive control. The driving assist ECU 4 is an electronic control unit including a central processing unit (CPU), read only memory (ROM), random access memory (RAM), and the like. In the driving assist ECU 4, various controls for driving assist are performed by loading the program stored in the ROM into the RAM and executing the program by the CPU. The driving assist ECU 4 may be configured with a plurality of electronic control units.

Next, a functional configuration of the driving assist ECU 4 will be described. The driving assist ECU 4 includes a lateral position recognition unit 11, an adjacent vehicle detection unit 12, a lane keeping assist unit (control unit) 13, and a target lateral position setting unit (shifting unit) 14.

The lateral position recognition unit 11 recognizes the lateral position of the host vehicle V. The lateral position recognition unit 11 recognizes the lane lines of the travelling lane R1 of the host vehicle V (in the example illustrated in FIG. 2A, the lane boundary line L1 and the center line L3) by an image analysis based on the images of the front and backside of the host vehicle V imaged by the stereo camera 1. The lateral position recognition unit 11 recognizes the lateral position of the host vehicle V in the travelling lane R1, for example, based on the position of the recognized lane lines in the images.

The adjacent vehicle detection unit 12 detects the adjacent vehicle X travelling in the adjacent lane R2. The adjacent vehicle detection unit 12 detects the obstacle travelling in the adjacent lane R2 as the adjacent vehicle X based on, for example, the obstacle information from the laser radar 2. The adjacent vehicle detection unit 12 may detect the adjacent vehicle X by the analyzing the captured image of the front and backside of the host vehicle V based on the image information from the stereo camera 1. The adjacent vehicle detection unit 12 recognizes a distance and a relative speed between the recognized adjacent vehicle X and the host vehicle V in the travelling direction based on, for example, the obstacle information from the laser radar 2. The distance between the adjacent vehicle X and the host vehicle V in the travelling direction is a vehicle-to-vehicle distance in the travelling direction of the host vehicle V along the travelling lane R1 of the host vehicle V. The relative speed between the adjacent vehicle X and the host vehicle V is a difference of the speeds between the speed of the adjacent vehicle X and the speed of the host vehicle V in the travelling direction of the host vehicle V along the travelling lane R1 of the host vehicle V.

The adjacent vehicle detection unit 12 detects a lane width direction distance between the adjacent vehicle X and the travelling lane R1 of the host vehicle V. The lane width direction distance is a distance of the travelling lane R1 in the lane width direction. The adjacent vehicle detection unit 12 in the present embodiment detects the lane width direction distance between the lane boundary line L1 of the travelling lane R1 which is the boundary to the adjacent lane R2 and the adjacent vehicle X. The adjacent vehicle detection unit 12 may detect the lane width direction distance between the adjacent vehicle X and the lane boundary line L1 based on the lane boundary line L1 detected based on the image information from the stereo camera 1 and the obstacle information from the laser radars 2. The adjacent vehicle detection unit 12 may detect a distance from the end portion of the adjacent vehicle X in the travelling lane R1 side to the lane boundary line L1 as the lane width direction distance. Alternatively, the adjacent vehicle detection unit 12 may detect a distance from the middle position of the adjacent vehicle X in the vehicle width direction to the lane boundary line L1 as the lane width direction distance.

In addition, the adjacent vehicle detection unit 12 is not limited to detecting the distance from the adjacent vehicle X to the lane boundary line L1 as the lane width direction distance. For example, the adjacent vehicle detection unit 12 may detect the distance from the adjacent vehicle X to the middle position Rc of the travelling lane R1 as the lane width direction distance. Even in this case, the adjacent vehicle detection unit 12 may detect the lane width direction distance between the adjacent vehicle X and the middle position Rc based on, for example, the middle position Rc of the travelling lane R1 detected based on the image information from the stereo camera 1 and the obstacle information from the laser radars 2. The middle position Rc is a position at the middle of the travelling lane R1 in the lane width direction. The adjacent vehicle detection unit 12 detects the lane boundary line L1 and the center line L3 forming the travelling lane R1 based on, for example, the image information from the stereo camera 1, and then, it is possible to detect the position equidistant from the lane boundary line L1 and the center line L3 as the middle position Rc of the travelling lane R1.

The lane keeping assist unit 13 performs the lane keeping assist for the host vehicle V. The lane keeping assist unit 13 starts the lane keeping assist based on, for example, the switching operation by the driver. The lane keeping assist unit 13 controls the travelling of the host vehicle V by giving the steering torque to the host vehicle V such that the lateral position of the host vehicle V recognized by the lateral position recognition unit 11 becomes the target lateral position set by the target lateral position setting unit 14. The lane keeping assist unit 13 gives the steering torque to the host vehicle V by transmitting a control signal to the steering control unit 5.

The target lateral position setting unit 14 sets the target lateral position used when the lane keeping assist unit 13 controls the lateral position of the host vehicle V. First, the target lateral position setting unit 14 sets the initial target lateral position T0 set for the travelling lane R1 in advance as the target lateral position to be used by the lane keeping assist unit 13. The initial target lateral position T0 is the middle position Rc in the travelling lane R1 in the width direction of the travelling lane.

In addition, the target lateral position setting unit 14 performs the shift processing for shifting the target lateral position to be used by the lane keeping assist unit 13 from the middle position Rc in the travelling lane R1 so as to be separated from the adjacent lane R2. Specifically, as the shift processing, the target lateral position setting unit 14 changes the target lateral position to be used by the lane keeping assist unit 13 from the initial target lateral position T0 to a changed target lateral position T1. A preset value may be used as an amount of shifting the target lateral position, that is, the distance between the middle position Rc and the changed target lateral position T1 in the lane width direction. The shift processing is executed in a case where the travelling direction distance between the adjacent vehicle X detected by the adjacent vehicle detection unit 12 and the host vehicle V is equal to or less than a travelling direction threshold value and in a case where the lane width direction distance between the adjacent vehicle X and the lane boundary line L1 is equal to or less than a lane width direction threshold value. Preset values can be used as the travelling direction threshold value and the lane width direction threshold value.

In a case where the travelling direction distance between the adjacent vehicle X detected by the adjacent vehicle detection unit 12 and the host vehicle V is greater than the travelling direction threshold value or in a case where the lane width direction distance between the adjacent vehicle X and the lane boundary line L1 is greater than the lane width direction threshold value, the target lateral position setting unit 14 ends the shift processing. That is, the target lateral position setting unit 14 returns the target lateral position to be used by the lane keeping assist unit 13 to the initial target lateral position T0 from the changed target lateral position T1.

Here, setting the target lateral position in a state in which one adjacent vehicle X is travelling in the adjacent lane R2 and in a case where the travelling host vehicle V is overtaking the adjacent vehicle X will be described using FIG. 2A and FIG. 2B. In FIG. 2A and FIG. 2B, a state in which the first adjacent vehicle X1 and the second adjacent vehicle X2 are travelling in the adjacent lane R2 is illustrated. However, the description will be made with a state in which only the first adjacent vehicle X1 is travelling. In addition, the lane width direction distance between the first adjacent vehicle X1 and the lane boundary line L1 is assumed to be equal to or less than the lane width direction threshold value.

The state illustrated in FIG. 2A is a state in a case where the travelling direction distance between the first adjacent vehicle X1 and the host vehicle V is greater than a travelling direction threshold value a. For this reason, the target lateral position setting unit 14 sets the initial target lateral position T0 as the target lateral position to be used by the lane keeping assist unit 13. In this way, the host vehicle V is controlled by the lane keeping assist unit 13 such that the lateral position becomes the initial target lateral position T0 (middle position Rc).

The state illustrated in FIG. 2B is a state in which the host vehicle V is close to the first adjacent vehicle X1, and a state in which the travelling direction distance between the first adjacent vehicle X1 and the host vehicle V is equal to or less than the travelling direction threshold value a. Here, the state in which the travelling direction distance is less than the travelling direction threshold value a includes a state in which the host vehicle V and the first adjacent vehicle X1 become close to each other and at least a part of the host vehicle V and the first adjacent vehicle X1 is overlapped in the lane width direction. In a case where the travelling direction distance is equal to or less than the travelling direction threshold value a, the target lateral position setting unit 14 performs the shift processing for shifting the target lateral position to be used by the lane keeping assist unit 13 to the changed target lateral position T1. In this way, the host vehicle V is controlled by the lane keeping assist unit 13 such that the lateral position becomes the changed target lateral position T1. That is, the lateral position of the host vehicle V becomes the position separated from the first adjacent vehicle X1.

From the state illustrated in FIG. 2B, if the host vehicle V overtakes the first adjacent vehicle X1, the travelling direction distance between the first adjacent vehicle X1 and the host vehicle V becomes greater than the travelling direction threshold value a. In this case, the target lateral position setting unit 14 returns the target lateral position to be used by the lane keeping assist unit 13 to the initial target lateral position T0 from the changed target lateral position T1. In this way, the host vehicle V is controlled by the lane keeping assist unit 13 such that the lateral position becomes the initial target lateral position T0.

Figure 4A:
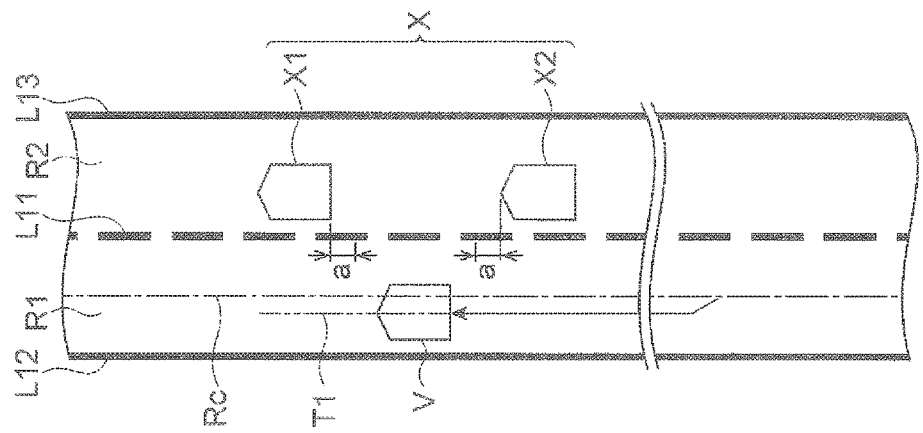
FIGS. 4A to 4C are plan views for illustrating a setting of a target lateral position in a case where an adjacent vehicle is overtaking a host vehicle when a lane keeping is assisted.
Figure 4B:
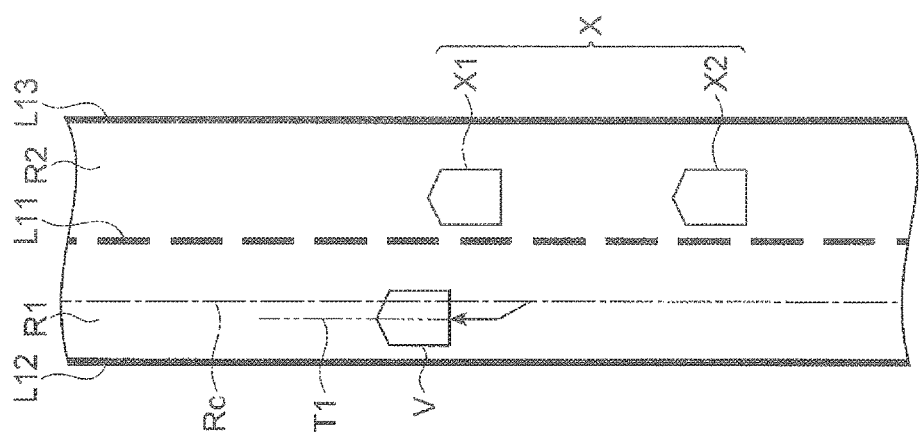

Next, setting the target lateral position in a state in which one adjacent vehicle X is travelling in the adjacent lane R2 and in a case where the travelling host vehicle V is overtaking the adjacent vehicle X will be described using FIGS. 4A and 4B. In FIGS. 4A and 4B, a state in which the first adjacent vehicle X1 and the second adjacent vehicle X2 are travelling in the adjacent lane R2 is illustrated. However, the description will be made with a state in which only the first adjacent vehicle X1 is travelling. In addition, the lane width direction distance between the first adjacent vehicle X1 and the lane boundary line L1 is assumed to be equal to or less than the lane width direction threshold value.

Here, FIGS. 4A to 4C, and FIGS. 5A and 5B are plan views for illustrating a setting of the target lateral position in a case where the host vehicle V is overtaken by the adjacent vehicle X when the lane keeping is assisted. L11 illustrated in FIG. 4A and the like is a lane line (lane boundary line) which is a boundary between the travelling lane R1 and the adjacent lane R2. L12 is a lane line (traffic zone boundary line) of the travelling lane R1 at the opposite side of the lane boundary line L11. L13 is a lane line (center line) of the adjacent lane R2 at the opposite side of the lane boundary line L11.

The state illustrated in FIG. 4A is a state in a case where the travelling direction distance between the first adjacent vehicle X1 and the host vehicle V is greater than the travelling direction threshold value a. For this reason, the target lateral position setting unit 14 sets the initial target lateral position T0 as the target lateral position to be used by the lane keeping assist unit 13. In this way, the host vehicle V is controlled by the lane keeping assist unit 13 such that the lateral position becomes the initial target lateral position T0 (middle position Rc).

The state illustrated in FIG. 4B is a state in which the first adjacent vehicle X1 is close to the host vehicle V, and a state in a case where the travelling direction distance between the first adjacent vehicle X1 and the host vehicle V is equal to or less than the travelling direction threshold value a. For this reason, the target lateral position setting unit 14 performs the shift processing for shifting the target lateral position to be used by the lane keeping assist unit 13 to the changed target lateral position T1. In this way, the host vehicle V is controlled by the lane keeping assist unit 13 such that the lateral position becomes the changed target lateral position T1. That is, the lateral position of the host vehicle V becomes the position separated from the first adjacent vehicle X1.

From the state illustrated in FIG. 4B, if the first adjacent vehicle X1 overtakes the host vehicle V, the travelling direction distance between the first adjacent vehicle X1 and the host vehicle V becomes greater than the travelling direction threshold value a. In this case, the target lateral position setting unit 14 returns the target lateral position to be used by the lane keeping assist unit 13 to the initial target lateral position T0 from the changed target lateral position T1. In this way, the host vehicle V is controlled by the lane keeping assist unit 13 such that the lateral position becomes the initial target lateral position T0.

In addition, there is a case where a plurality of adjacent vehicles X is travelling in the adjacent lane R2. Hereinafter, setting of the target lateral position performed by the target lateral position setting unit 14 in a case where the first adjacent vehicle X1 and the second adjacent vehicle X2 are travelling in the adjacent lane R2 will be described. First, the case where the host vehicle V overtakes the first adjacent vehicle X1 and the second adjacent vehicle X2 will be described. Here, is assumed that the target lateral position setting unit 14 performs the above-described shift processing on the first adjacent vehicle X1 travelling in front of the host vehicle V detected by the adjacent vehicle detection unit 12.

When the distance between the second adjacent vehicle X2 travelling immediately in front of the first adjacent vehicle X1 and the first adjacent vehicle X1 is equal to less than a vehicle-to-vehicle distance threshold value and the lane width direction distance between the second adjacent vehicle X2 and the lane boundary line L1 of the host vehicle V is equal to or less than the lane width direction threshold value, the target lateral position setting unit 14 maintains the shift processing on the first adjacent vehicle X1 until the shift processing is performed on the second adjacent vehicle X2. The target lateral position setting unit 14 may perform the determination whether or not the distance between the first adjacent vehicle X1 and the second adjacent vehicle X2 is equal to or less than the vehicle-to-vehicle distance threshold value and whether or not the lane width direction distance is equal to or less than the lane width direction threshold value after the host vehicle V overtakes the first adjacent vehicle X1. The fact that the host vehicle V overtakes the first adjacent vehicle X1 may include a case where the front end of the host vehicle V overtakes the front end of the first adjacent vehicle X1 or a case where the front end of the host vehicle V overtakes the front end of the first adjacent vehicle X1 by a predetermined distance. In addition, the distance between the second adjacent vehicle X2 and the first adjacent vehicle X1 is assumed to be the vehicle-to-vehicle distance between the second adjacent vehicle X2 and the first adjacent vehicle X1. A preset value can be used as the vehicle-to-vehicle distance threshold value.

That is, even when the host vehicle V overtakes the first adjacent vehicle X1 and the travelling direction distance between the host vehicle V and the first adjacent vehicle X1 becomes greater than the travelling direction threshold value a, the target lateral position setting unit 14 maintains the state in which the changed target lateral position T1 is set as the target lateral position to be used by the lane keeping assist unit 13. When the host vehicle V overtakes the first adjacent vehicle X1 and the travelling direction distance between the host vehicle V and the second adjacent vehicle X2 is equal to or less than the travelling direction threshold value a, the target lateral position setting unit 14 performs the shift processing on the second adjacent vehicle X2. Since the shift processing on the first adjacent vehicle X1 is maintained, when performing the shift processing on the second adjacent vehicle X2, the target lateral position setting unit 14 maintains the state in which the changed target lateral position T1 is set as the target lateral position to be used by the lane keeping assist unit 13.

The target lateral position setting unit 14 ends the shift processing in the state in which the shift processing is performed on the second adjacent vehicle X2 and in a case where the travelling direction distance between the second adjacent vehicle X2 and the host vehicle V becomes greater than the travelling direction threshold value a, or in a case where the lane width direction distance between the second adjacent vehicle X2 and the lane boundary line L1 becomes greater than the lane width direction threshold value. That is, the target lateral position setting unit 14 returns the target lateral position to be used by the lane keeping assist unit 13 to the initial target lateral position T0 from the changed target lateral position T1.

Here, the setting of the target lateral position in a state in which the first adjacent vehicle X1 and the second adjacent vehicle X2 are travelling in the adjacent lane R2 and in a case where the travelling host vehicle V overtakes the first adjacent vehicle X1 and the second adjacent vehicle X2 will be described using FIGS. 2A to 2C and FIGS. 3A and 3B. In addition, the lane width direction distance between the first adjacent vehicle X1 and the second adjacent vehicle X2 and the lane boundary line L1 is assumed to be equal to or less than the lane width direction threshold value. The distance between the first adjacent vehicle X1 and the second adjacent vehicle X2 is assumed to be equal to or less than the vehicle-to-vehicle distance threshold value.

The state illustrated in FIG. 2A is the state in a case where the travelling direction distance between the first adjacent vehicle X1 and the host vehicle V is greater than the travelling direction threshold value a. For this reason, the target lateral position setting unit 14 sets the initial target lateral position T0 as the target lateral position to be used by the lane keeping assist unit 13. In this way, the host vehicle V is controlled by the lane keeping assist unit 13 such that the lateral position becomes the initial target lateral position T0 (middle position Rc).

The state illustrated in FIG. 2B is a state in which the host vehicle V is close to the first adjacent vehicle X1 and the travelling direction distance between the first adjacent vehicle X1 and the host vehicle V is equal to or less than the travelling direction threshold value a. In a case where the travelling direction distance is equal to or less than travelling direction threshold value a, the target lateral position setting unit 14 performs the shift processing for shifting the target lateral position to be used by the lane keeping assist unit 13 to the changed target lateral position T1. In this way, the host vehicle V is controlled by the lane keeping assist unit 13 such that the lateral position becomes the changed target lateral position T1. That is, the lateral position of the host vehicle V becomes the position separated from the first adjacent vehicle X1.

Figure 2C:
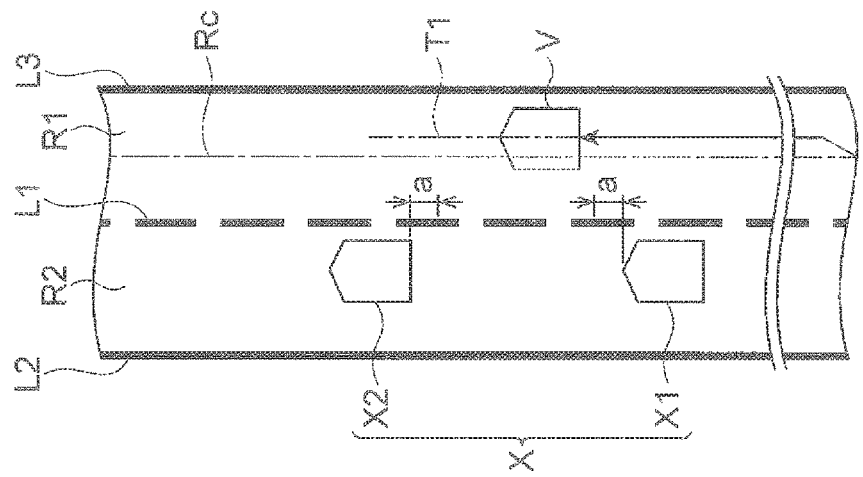
FIGS. 2A to 2C are plan views for illustrating a setting of a target lateral position in a case where a host vehicle is overtaking an adjacent vehicle when a lane keeping is assisted.
Figure 2B:
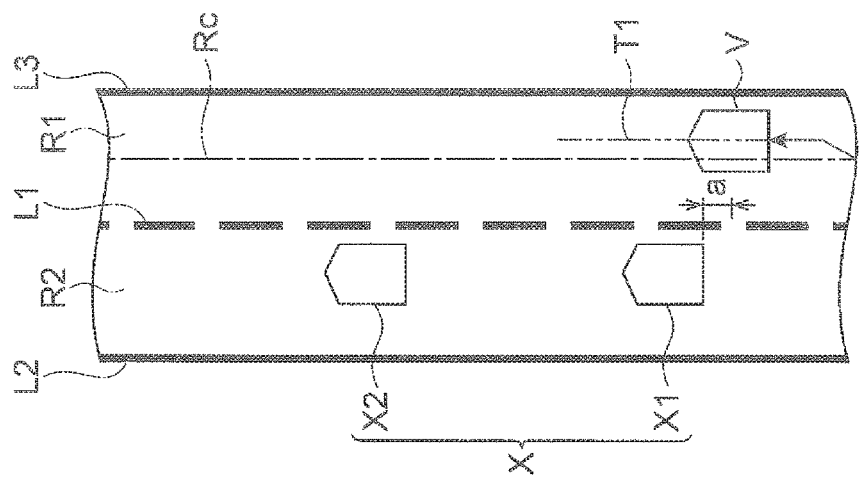
Figure 2A:
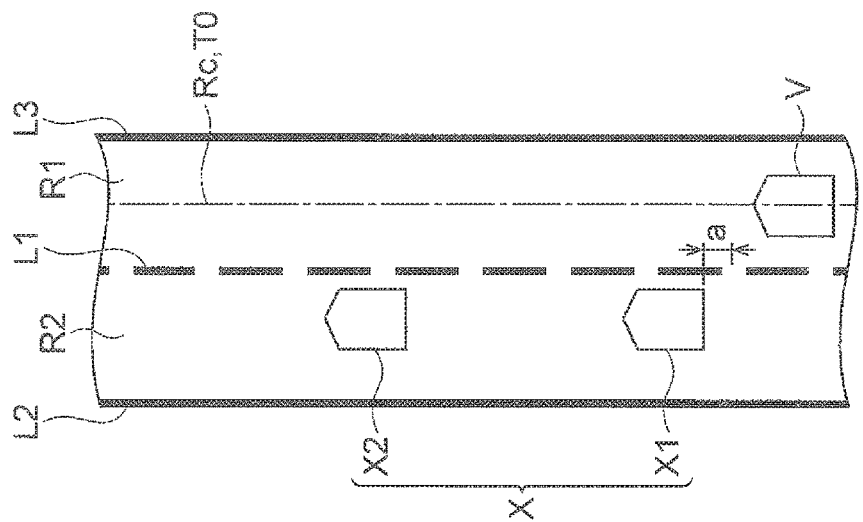

The state illustrated in FIG. 2C is a state in which the host vehicle V overtakes the first adjacent vehicle X1 from the state illustrated in FIG. 2B and the travelling direction distance between the first adjacent vehicle X1 and the host vehicle V is greater than the travelling direction threshold value a. In addition, in the state, the travelling direction distance between the host vehicle V and the second adjacent vehicle X2 is greater than the travelling direction threshold value a. Even when the travelling direction distance between the host vehicle V and the first adjacent vehicle X1 is greater than the travelling direction threshold value a, the target lateral position setting unit 14 maintains the state in which the changed target lateral position T1 is set without returning the target lateral position to the initial target lateral position T0.

The state illustrated in FIG. 3A is a state in which the host vehicle V overtakes the second adjacent vehicle X2 and the travelling direction distance between the second adjacent vehicle X2 and the host vehicle V is equal to or less than the travelling direction threshold value a. Since the travelling direction distance is equal to or less than the travelling direction threshold value a, the target lateral position setting unit 14, as it is, maintains the changed target lateral position T1 as the target lateral position to be used by the lane keeping assist unit 13. In this way, the lateral position of the host vehicle V is maintained to be the changed target lateral position T1 as it is.

The state illustrated in FIG. 3B is a state in which the host vehicle V further overtakes the second adjacent vehicle X2 and the travelling direction distance between the second adjacent vehicle X2 and the host vehicle V becomes greater than the travelling direction threshold value a. In this case, the target lateral position setting unit 14 returns the target lateral position to be used by the lane keeping assist unit 13 to the initial target lateral position T0 from the changed target lateral position T1. In this way, the host vehicle V is controlled by the lane keeping assist unit 13 such that the lateral position becomes the initial target lateral position T0.

Here, an example is described, in which the target lateral position setting unit 14 sets the target lateral position in a case where two adjacent vehicles X (the first adjacent vehicle X1 and the second adjacent vehicle X2) are travelling in the adjacent lane R2. However, three or more adjacent vehicles X may also be travelling. That is, in a case where the host vehicle V overtakes the second adjacent vehicle X2, the target lateral position is set with the original second adjacent vehicle X2 as a new first adjacent vehicle X1 and with the adjacent vehicle X travelling immediately front of the original second adjacent vehicle X2 as a new second adjacent vehicle X2. The case where the host vehicle V overtakes the second adjacent vehicle X2 may include the case where the front end of the host vehicle V overtakes the front end of the second adjacent vehicle X2 or the case where the front end of the host vehicle V overtakes the front end of the second adjacent vehicle X2 by a predetermined distance.

In addition, even in a case where the distance between the first adjacent vehicle X1 and the second adjacent vehicle X2 is greater than the vehicle-to-vehicle distance threshold value, the target lateral position setting unit 14 may maintain the shift processing on the first adjacent vehicle X1 until performing the shift processing on the second adjacent vehicle X2. For example, even in a case where the target lateral position setting unit 14 performs the shift processing on the first adjacent vehicle X1, it is assumed that the distance between the second adjacent vehicle X2 and the first adjacent vehicle X1 is greater than the vehicle-to-vehicle distance threshold value and the lane width direction distance between the second adjacent vehicle X2 and the lane boundary line L1 is equal to or less than the lane width direction threshold value, and the speed of the host vehicle V is higher than the speed of the second adjacent vehicle X2. In this case, the target lateral position setting unit 14 calculates a middle position travelling time which is a duration from the time when the shift processing on the first adjacent vehicle X1 ends and the lateral position of the host vehicle V is returned to the middle position Rc to the time when the host vehicle V is separated again from the middle position Rc by the shift processing being performed on the second adjacent vehicle X2. Then, when the middle position travelling time is equal to or less than a travelling time threshold value, the target lateral position setting unit 14 maintains the shift processing on the first adjacent vehicle X1 until the shift processing is performed on the second adjacent vehicle X2. The target lateral position setting unit 14 may determine whether or not the speed of the host vehicle V is higher than the speed of the second adjacent vehicle X2 based on the change of the travelling direction distance between the host vehicle V and the second adjacent vehicle X2 which is recognized based on the obstacle information from the laser radar 2, for example.

The target lateral position setting unit 14 is not limited to maintain the shift processing when the middle position travelling time is equal to or less than the travelling time threshold value. For example, in a case where the relative speed between the host vehicle V and the second adjacent vehicle X2 is higher than a relative speed threshold value or in a case where the relative distance between the host vehicle V and the second adjacent vehicle X2 is equal to or less than a relative distance threshold value, the target lateral position setting unit 14 may maintain the shift processing on the first adjacent vehicle X1 until the shift processing is performed on the second adjacent vehicle X2.

Next, a case where the host vehicle V is overtaken by the first adjacent vehicle X1 and the second adjacent vehicle X2 will be described. Here, it is assumed that the target lateral position setting unit 14 performs the shift processing on the first adjacent vehicle X1 detected by the adjacent vehicle detection unit 12 and travelling on the backside of the host vehicle V.

In a case where the distance between the second adjacent vehicle X2 travelling immediately after the first adjacent vehicle X1 and the first adjacent vehicle X1 is equal to or less than the vehicle-to-vehicle distance threshold value and in a case where the lane width direction distance between the second adjacent vehicle X2 and the lane boundary line L11 of the host vehicle V is equal to or less than lane width direction threshold value, the target lateral position setting unit 14 maintains the shift processing on the first adjacent vehicle X1 until the shift processing is performed on the second adjacent vehicle X2. The target lateral position setting unit 14 may perform the determination whether or not the distance between the first adjacent vehicle X1 and the second adjacent vehicle X2 is equal to or less than the vehicle-to-vehicle distance threshold value and whether or not the lane width direction distance is equal to or less than lane width direction threshold value, after the host vehicle V overtaken by the first adjacent vehicle X1. The case where the host vehicle V is overtaken by the first adjacent vehicle X1 may include a case where the front end of the first adjacent vehicle X1 overtakes the front end of the host vehicle V or a case where the front end of the first adjacent vehicle X1 overtakes the front end of the host vehicle V by a predetermined distance.

That is, even when the first adjacent vehicle X1 overtakes the host vehicle V and the travelling direction distance between the host vehicle V and the first adjacent vehicle X1 becomes greater than the travelling direction threshold value a, the target lateral position setting unit 14 maintains the state in which the changed target lateral position T1 is set as the target lateral position to be used by the lane keeping assist unit 13. When the host vehicle V is overtaken by the first adjacent vehicle X1 and the travelling direction distance between the host vehicle V and the second adjacent vehicle X2 becomes equal to or less than the travelling direction threshold value a, the target lateral position setting unit 14 performs the shift processing on the second adjacent vehicle X2. Since the shift processing on the first adjacent vehicle X1 is maintained, at the time of performing the shift processing on the second adjacent vehicle X2, the lateral position setting unit 14 maintains the state in which the changed target lateral position T1 is set as the target lateral position to be used by the lane keeping assist unit 13.

In the state in which the shift processing is performed on the second adjacent vehicle X2 and in a case where travelling direction distance between the second adjacent vehicle X2 and the host vehicle V becomes greater than the travelling direction threshold value a, or in a case where the lane width direction distance between the second adjacent vehicle X2 and the lane boundary line L1 becomes greater than the lane width direction threshold value, the target lateral position setting unit 14 ends the shift processing. That is, the target lateral position setting unit 14 returns the target lateral position to be used by the lane keeping assist unit 13 to the initial target lateral position T0 from the changed target lateral position T1.

Here, setting the target lateral position in a state in which the first adjacent vehicle X1 and the second adjacent vehicle X2 are travelling in the adjacent lane R2 and in a case where the travelling host vehicle V is overtaken by the first adjacent vehicle X1 and the second adjacent vehicle X2 will be described using FIGS. 4A to 4C and FIGS. 5A and 5B. In addition, the lane width direction distance between the first adjacent vehicle X1 and the second adjacent vehicle X2, and the lane boundary line L1 is assumed to be equal to or less than the lane width direction threshold value. The distance between the first adjacent vehicle X1 and the second adjacent vehicle X2 is assumed to be equal to or less than the vehicle-to-vehicle distance threshold value.

A state illustrated in FIG. 4A is a state in a case where the travelling direction distance between the first adjacent vehicle X1 and the host vehicle V is greater than the travelling direction threshold value a. For this reason, the target lateral position setting unit 14 sets the initial target lateral position T0 as the target lateral position to be used by the lane keeping assist unit 13. In this way, the host vehicle V is controlled by the lane keeping assist unit 13 such that the lateral position becomes the initial target lateral position T0 (middle position Rc).

A state illustrated in FIG. 4B is a state in which the first adjacent vehicle X1 is close to the host vehicle V, and a state in which the travelling direction distance between the first adjacent vehicle X1 and the host vehicle V is equal to or less than travelling direction threshold value a. In a case where the travelling direction distance is equal to or less than the travelling direction threshold value a, the target lateral position setting unit 14 performs the shift processing for shifting the target lateral position to be used by the lane keeping assist unit 13 to the changed target lateral position T1. In this way, the host vehicle V is controlled by the lane keeping assist unit 13 such that the lateral position becomes the changed target lateral position T1. That is, the lateral position of the host vehicle V becomes the position separated from the first adjacent vehicle X1.

Figure 4C:
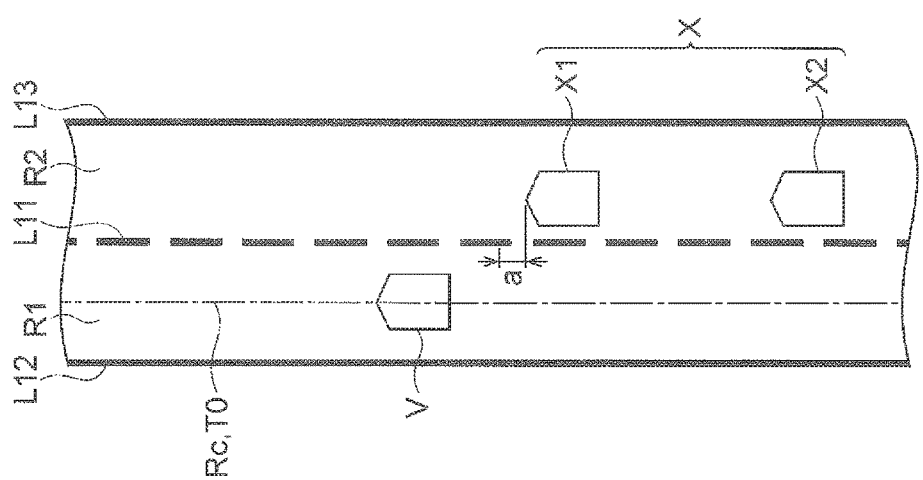

A state illustrated in FIG. 4C is a state in which the first adjacent vehicle X1 further overtakes the host vehicle V from the state illustrated in FIG. 4A and the travelling direction distance between the first adjacent vehicle X1 and the host vehicle V is greater than the travelling direction threshold value a. In addition, the above state is a state in which the travelling direction distance between the host vehicle V and the second adjacent vehicle X2 is greater than the travelling direction threshold value a. Even when the travelling direction distance between the host vehicle V and the first adjacent vehicle X1 becomes greater than the travelling direction threshold value a, the target lateral position setting unit 14 maintains the state of the changed target lateral position T1 without returning target lateral position to the initial target lateral position T0.

Figure 5A:
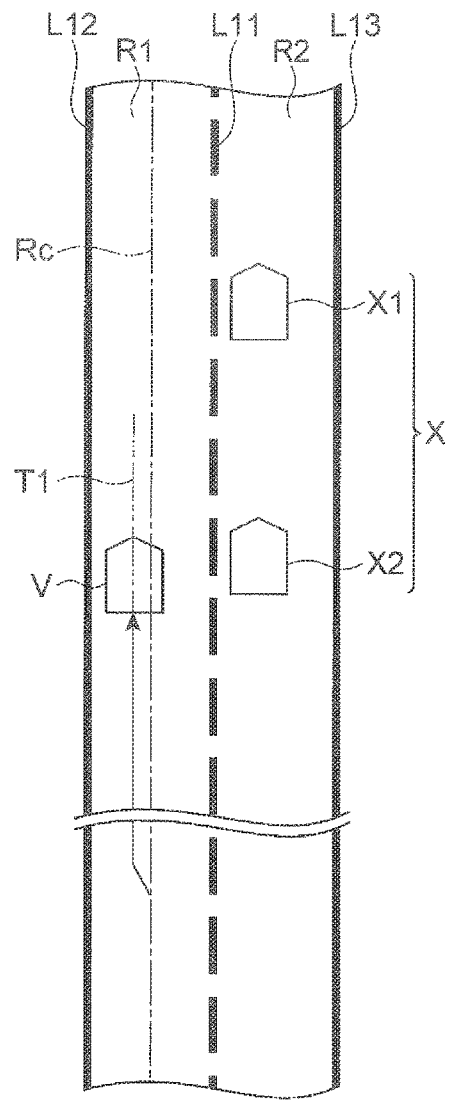
FIGS. 5A and 5B are plan views for illustrating a setting of a target lateral position in a case where an adjacent vehicle is overtaking a host vehicle when a lane keeping is assisted.

A state illustrated in FIG. 5A is a state in which the second adjacent vehicle X2 overtakes the host vehicle V and the travelling direction distance between the second adjacent vehicle X2 and the host vehicle V is equal to or less than the travelling direction threshold value a. Since the travelling direction distance is equal to or less than the travelling direction threshold value a, the target lateral position setting unit 14 maintains the target lateral position to be used by the lane keeping assist unit 13 as the changed target lateral position T1 as it is. In this way, the lateral position of the host vehicle V is maintained to be the changed target lateral position T1 as it is.

Figure 5B:
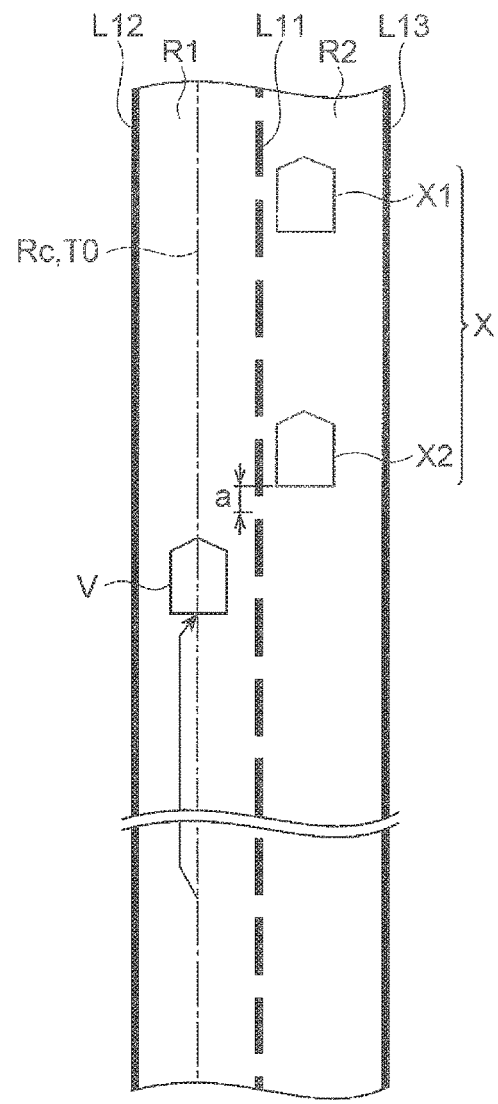

A state illustrated in FIG. 5B is a state in which the second adjacent vehicle X2 overtakes the host vehicle V and the travelling direction distance between the second adjacent vehicle X2 and the host vehicle V becomes greater than the travelling direction threshold value a. In this case, the target lateral position setting unit 14 returns the target lateral position to be used by the lane keeping assist unit 13 to the initial target lateral position T0 from the changed target lateral position T1. In this way, the host vehicle V is controlled by the lane keeping assist unit 13 such that the lateral position becomes the initial target lateral position T0.

Here, an example in which the target lateral position setting unit 14 sets the target lateral position in a case where two adjacent vehicles X (the first adjacent vehicle X1 and the second adjacent vehicle X2) are travelling in the adjacent lane R2. However, three or more adjacent vehicles X may also be travelling. That is, in a case where the second adjacent vehicle X2 overtakes the host vehicle V, the target lateral position is set with the original second adjacent vehicle X2 as a new first adjacent vehicle X1 and with the adjacent vehicle X travelling immediately behind the original second adjacent vehicle X2 as a new second adjacent vehicle X2. The case where the second adjacent vehicle X2 overtakes the host vehicle V may include the case where the front end of the second adjacent vehicle X2 overtakes the front end of the host vehicle V or the case where the front end of the second adjacent vehicle X2 overtakes the front end of the host vehicle V by a predetermined distance.

In addition, even in a case where the distance between the first adjacent vehicle X1 and the second adjacent vehicle X2 is greater than the vehicle-to-vehicle distance threshold value, the target lateral position setting unit 14 may maintain the shift processing on the first adjacent vehicle X1 until the performing the shift processing on the second adjacent vehicle X2. For example, even in a case where the target lateral position setting unit 14 performs the shift processing on the first adjacent vehicle X1, it is assumed that the distance between the second adjacent vehicle X2 and the first adjacent vehicle X1 is greater than the vehicle-to-vehicle distance threshold value and the lane width direction distance between the second adjacent vehicle X2 and the lane boundary line L1 is equal to or less than the lane width direction threshold value, and the speed of the host vehicle V is lower than the speed of the second adjacent vehicle X2. In this case, the target lateral position setting unit 14 calculates the middle position travelling time which is the duration from the time when the shift processing on the first adjacent vehicle X1 ends and the lateral position of the host vehicle V is returned to the middle position Rc to the time when the host vehicle V is separated again from the middle position Rc by the shift processing being performed on the second adjacent vehicle X2. Then, when the middle position travelling time is equal to or less than a travelling time threshold value, the target lateral position setting unit 14 maintains the shift processing until the shift processing on the first adjacent vehicle X1 is performed on the second adjacent vehicle X2. The target lateral position setting unit 14 may determine whether or not the speed of the host vehicle V is lower than the speed of the second adjacent vehicle X2 based on the change of the travelling direction distance between the host vehicle V and the second adjacent vehicle X2 which is recognized based on the obstacle information from the laser radar 2, for example.

The target lateral position setting unit 14 is not limited to maintain the shift processing when the middle position travelling time is equal to or less than the travelling time threshold value. For example, in a case where the relative speed between the host vehicle V and the second adjacent vehicle X2 is higher than a relative speed threshold value or in a case where the relative distance between the host vehicle V and the second adjacent vehicle X2 is equal to or less than a relative distance threshold value, the target lateral position setting unit 14 may maintain the shift processing on the first adjacent vehicle X1 until the shift processing is performed on the second adjacent vehicle X2.

Next, a method of setting the target lateral position performed by the lane following control device 100 will be described using flowcharts in FIG. 6 and FIG. 7. The flowcharts in FIG. 6 and FIG. 7 are executed during the execution of the lane keeping assist. In addition, in a case where the driver ends the lane keeping assist, the lane following control device 100 ends the processing tasks illustrated in FIG. 6 and FIG. 7.

In a case where the host vehicle V overtakes the adjacent vehicle X, the target lateral position setting unit 14 executes the processing tasks illustrated in FIG. 6. In addition, in a case where the host vehicle V is overtaken by the adjacent vehicle X, the target lateral position setting unit 14 executes the processing tasks illustrated in FIG. 7. The target lateral position setting unit 14 may determine whether the host vehicle V overtakes the adjacent vehicle X or is overtaken by the adjacent vehicle X based on the change of the travelling direction distance between the host vehicle V and the adjacent vehicle X which is recognized based on the obstacle information from the laser radar 2, for example.

First, the case where the host vehicle V overtakes the adjacent vehicle X will be described using the flowchart illustrated in FIG. 6. Here, it is assumed that a plurality of adjacent vehicles X is travelling in the adjacent lane R2. The state in which the plurality of adjacent vehicles X is travelling in the adjacent lane R2 and the case where the host vehicle V overtakes the adjacent vehicle X is the case illustrated in, for example, FIGS. 2A to 2C and FIGS. 3A and 3B.

As illustrated in FIG. 6, the target lateral position setting unit 14 determines whether or not the travelling direction distance between the first adjacent vehicle X1 and the host vehicle V is equal to or less than the travelling direction threshold value a (S101). In a case where the travelling direction distance is not equal to or less than travelling direction threshold value a (NO in S101), the target lateral position setting unit 14 performs again the processing in S101. In a case where the travelling direction distance is equal to or less than travelling direction threshold value a (YES in S101), the target lateral position setting unit 14 determines whether or not the lane width direction distance between the first adjacent vehicle X1 and the lane boundary line L1 is equal to or less than the lane width direction threshold value (S102). In a case where the lane width direction distance is not equal to or less than the lane width direction threshold value (NO in S102), the target lateral position setting unit 14 performs again the processing in S101. In a case where the lane width direction distance is equal to or less than the lane width direction threshold value (YES in S102), the target lateral position setting unit 14 performs the shift processing on the first adjacent vehicle X1 (S103). That is, the target lateral position setting unit 14 changes the target lateral position to be used by the lane keeping assist unit 13 to the changed target lateral position T1 from the initial target lateral position T0.

The target lateral position setting unit 14 determines whether or not the host vehicle V overtakes the first adjacent vehicle X1 (S104). In a case where the host vehicle V does not overtake the first adjacent vehicle X1 (NO in S104), the target lateral position setting unit 14 performs the processing in S103. That is, the target lateral position setting unit 14 maintains the shift processing on the first adjacent vehicle X1. There is a case where the host vehicle V cannot overtake the first adjacent vehicle X1 such as a case where the speed of the first adjacent vehicle X1 becomes high or the like. In this case, the target lateral position setting unit 14 may end the shift processing in a case where the travelling direction distance between the host vehicle V and the first adjacent vehicle X1 exceeds the travelling direction threshold value a.

In a case where the host vehicle V overtakes the first adjacent vehicle X1 (YES in S104), the target lateral position setting unit 14 determines whether or not the lane width direction distance between the second adjacent vehicle X2 and the lane boundary line L1 is equal to or less than the lane width direction threshold value (S105). In a case where the lane width direction distance is not equal to or less than the lane width direction threshold value (NO in S105), the target lateral position setting unit 14 ends the shift processing on the first adjacent vehicle X1 in a case where the travelling direction distance between the host vehicle V and the first adjacent vehicle X1 becomes greater than the travelling direction threshold value a (S110). That is, the target lateral position setting unit 14 returns the target lateral position to be used by the lane keeping assist unit 13 to the initial target lateral position T0 from the changed target lateral position T1.

In a case where the lane width direction distance between the second adjacent vehicle x2 and the lane boundary line L1 is equal to or less than the lane width direction threshold value (YES in S105), the target lateral position setting unit 14 determines whether or not the distance between the second adjacent vehicle X2 and the first adjacent vehicle X1 is equal to or less than the vehicle-to-vehicle distance threshold value (S106). In a case where the distance between the second adjacent vehicle X2 and the first adjacent vehicle X1 is equal to or less than the vehicle-to-vehicle distance threshold value (YES in S106), the target lateral position setting unit 14 maintains the shift processing on the first adjacent vehicle X1 until the shift processing is performed on the second adjacent vehicle X2 (S107). Then, when the travelling direction distance between the host vehicle V and the second adjacent vehicle X2 is equal to or less than the travelling direction threshold value a, the target lateral position setting unit 14 performs the shift processing on the second adjacent vehicle X2. Therefore, even when the host vehicle V overtakes the first adjacent vehicle X1, the target lateral position is maintained to be in the state of being set to the changed target lateral position T1 without being returned to the initial target lateral position T0.

Next, the target lateral position setting unit 14 determines whether or not the host vehicle V overtakes the second adjacent vehicle X2 (S108). In a case where the host vehicle V does not overtake the second adjacent vehicle X2 (NO in S108), the target lateral position setting unit 14 maintains the shift processing on the second adjacent vehicle X2 (S107). There is a case where the host vehicle V cannot overtake the second adjacent vehicle X2 such as a case where the speed of the second adjacent vehicle X2 becomes high or the like. In this case, the target lateral position setting unit 14 may end the shift processing in a case where the travelling direction distance between the host vehicle V and the second adjacent vehicle X2 exceeds the travelling direction threshold value a.

In a case where the host vehicle V overtakes the second adjacent vehicle X2 (YES in S108), the target lateral position setting unit 14 determines whether or not the adjacent vehicle X exists immediately front of the second adjacent vehicle X2 in the adjacent lane R2 (S109). In a case where the adjacent vehicle X exists (YES in S109), the target lateral position setting unit 14 performs the above-described processing tasks in S105 and subsequent thereto with the original second adjacent vehicle X2 as a new first adjacent vehicle X1 and with the adjacent vehicle X travelling immediately front of the original second adjacent vehicle X2 as a new second adjacent vehicle X2. In a case where the adjacent vehicle X does not exist (NO in S109), the target lateral position setting unit 14 ends the shift processing on the second adjacent vehicle X2 in a case where the travelling direction distance between the host vehicle V and the second adjacent vehicle X2 becomes greater than the travelling direction threshold value a (S110).

In addition, in a case where the distance between the second adjacent vehicle X2 and the first adjacent vehicle X1 is not equal to or less than the vehicle-to-vehicle distance threshold value (NO in S106), the target lateral position setting unit 14 determines whether or not the speed of the host vehicle V is higher than the speed of the second adjacent vehicle X2 (S111). A case where the speed of the host vehicle V is not higher than the speed of the second adjacent vehicle X2 is a case where the host vehicle V cannot overtake the second adjacent vehicle X2. Therefore, in a case where the speed of the host vehicle V is not higher than the speed of the second adjacent vehicle X2 (NO in S111), the target lateral position setting unit 14 ends the shift processing on the first adjacent vehicle X1 in a case where the travelling direction distance between the host vehicle V and the first adjacent vehicle X1 becomes greater than the travelling direction threshold value a (S110).

In a case where the speed of the host vehicle V is higher than the speed of the second adjacent vehicle X2 (YES in S111), the target lateral position setting unit 14 calculates the middle position travelling time which is the duration from the time when the shift processing on the first adjacent vehicle X1 ends and the lateral position of the host vehicle V is returned to the middle position Rc to the time when the host vehicle V is separated again from the middle position Rc by the shift processing being performed on the second adjacent vehicle X2. Then, the target lateral position setting unit 14 determines whether or not the middle position travelling time is equal to or less than the travelling time threshold value (S112). In a case where the middle position travelling time is not equal to or less than the travelling time threshold value (NO in S112), the target lateral position setting unit 14 ends the shift processing on the first adjacent vehicle X1 in a case where the travelling direction distance between the host vehicle V and the first adjacent vehicle X1 becomes greater than the travelling direction threshold value a (S110). In a case where the middle position travelling time is equal to or less than the travelling time threshold value (YES in S112), the target lateral position setting unit 14 performs the processing tasks in S107 and subsequent thereto.

Next, the case where the adjacent vehicle X overtakes the host vehicle V will be described using the flowchart illustrated in FIG. 7. Here, it is assumed that a plurality of adjacent vehicles X is travelling in the adjacent lane R2. The state in which the plurality of adjacent vehicles X is travelling in the adjacent lane R2 and the case where the adjacent vehicle X overtakes the host vehicle V is the case illustrated in, for example, FIGS. 4A to 4C and FIGS. 5A and 5B.

The processing tasks in S201 to S203 illustrated in FIG. 7 are the same the processing tasks in S101 to S103 described using FIG. 6, and the description thereof will not be repeated. After performing the shift processing on the first adjacent vehicle X1 (after the processing in S203), the target lateral position setting unit 14 determines whether or not the first adjacent vehicle X1 overtakes the host vehicle V (S204). In a case where the first adjacent vehicle X1 does not overtake the host vehicle V (NO in S204), the target lateral position setting unit 14 performs the processing in S203. That is, the target lateral position setting unit 14 maintains the shift processing on the first adjacent vehicle X1. There is a case where the first adjacent vehicle X1 cannot overtake the host vehicle V such as a case where the speed of the first adjacent vehicle X1 becomes low or the like. In this case, the target lateral position setting unit 14 may end the shift processing in a case where the travelling direction distance between the host vehicle V and the first adjacent vehicle X1 exceeds the travelling direction threshold value a.

In a case where the first adjacent vehicle X1 overtakes the host vehicle V (YES in S204), the target lateral position setting unit 14 determines whether or not the lane width direction distance between the second adjacent vehicle X2 and the lane boundary line L11 is equal to or less than the lane width direction threshold value (S205). In a case where the lane width direction distance is not equal to or less than the lane width direction threshold value (NO in S205), the target lateral position setting unit 14 ends the shift processing on the first adjacent vehicle X1 in a case where the travelling direction distance between the host vehicle V and the first adjacent vehicle X1 becomes greater than the travelling direction threshold value a (S210). That is, the target lateral position setting unit 14 returns the target lateral position to be used by the lane keeping assist unit 13 to the initial target lateral position T0 from the changed target lateral position T1.

In a case where the lane width direction distance between the second adjacent vehicle X2 and the lane line L11 is equal to or less than the lane width direction threshold value (YES in S205), the target lateral position setting unit 14 determines whether or not the distance between the second adjacent vehicle X2 and the first adjacent vehicle X1 is equal to or less than the vehicle-to-vehicle distance threshold value (S206). In a case where the distance between the second adjacent vehicle X2 and the first adjacent vehicle X1 is equal to or less than the vehicle-to-vehicle distance threshold value (YES in S206), the target lateral position setting unit 14 maintains the shift processing on the first adjacent vehicle X1 until the shift processing is performed on the second adjacent vehicle X2 (S207). Then, when the travelling direction distance between the host vehicle V and the second adjacent vehicle X2 becomes equal to or less than travelling direction threshold value a, the target lateral position setting unit 14 performs the shift processing on the second adjacent vehicle X2. Therefore, even when the second adjacent vehicle X2 overtakes the host vehicle V, the target lateral position is maintained to be in the state of being set to the changed target lateral position T1 without being returned to the initial target lateral position T0.

Next, the target lateral position setting unit 14 determines whether or not second adjacent vehicle X2 overtakes the host vehicle V (S208). In a case where the second adjacent vehicle X2 does not overtake the host vehicle V (NO in S208), the target lateral position setting unit 14 maintains the shift processing on the second adjacent vehicle X2 (S207). There is a case where the second adjacent vehicle X2 cannot overtake the host vehicle V such as a case where the speed of the second adjacent vehicle X2 becomes low or the like. In this case, the target lateral position setting unit 14 may end the shift processing in a case where the travelling direction distance between the host vehicle V and the second adjacent vehicle X2 exceeds the travelling direction threshold value a.

In a case where the second adjacent vehicle X2 overtakes the host vehicle V (YES in S208), the target lateral position setting unit 14 determines whether or not the adjacent vehicle X exists immediately behind the second adjacent vehicle X2 in the adjacent lane R2 (S209). In a case where the adjacent vehicle X exists (YES in S209), the target lateral position setting unit 14 performs the above-described processing tasks in S205 and subsequent thereto with the original second adjacent vehicle X2 as a new first adjacent vehicle X1 and with the adjacent vehicle X travelling immediately behind the original second adjacent vehicle X2 as a new second adjacent vehicle X2. In a case where the adjacent vehicle X does not exist (NO in S209), the target lateral position setting unit 14 ends the shift processing on the second adjacent vehicle X2 in a case where the travelling direction distance between the host vehicle V and the second adjacent vehicle X2 becomes greater than the travelling direction threshold value a (S210).

In addition, in a case where the distance between the second adjacent vehicle X2 and the first adjacent vehicle X1 is not equal to or less than the vehicle-to-vehicle distance threshold value (NO in S206), the target lateral position setting unit 14 determines whether or not the speed of the second adjacent vehicle X2 is higher than the speed of the host vehicle V (S211). A case where the speed of the second adjacent vehicle X2 is not higher than the speed of the host vehicle V is a case where the second adjacent vehicle X2 cannot overtake the host vehicle V. Therefore, in a case where the speed of the second adjacent vehicle X2 is not higher than the speed of the host vehicle V (NO in S211), the target lateral position setting unit 14 ends the shift processing on the first adjacent vehicle X1 in a case where the travelling direction distance between the host vehicle V and the first adjacent vehicle X1 becomes greater than the travelling direction threshold value a (S210).

In a case where the speed of the second adjacent vehicle X2 is higher than the speed of the host vehicle V (YES in S211), the target lateral position setting unit 14 calculates the middle position travelling time which is the duration from the time when the shift processing on the first adjacent vehicle X1 ends and the lateral position of the host vehicle V is returned to the middle position Rc to the time when the host vehicle V is separated again from the middle position Rc by the shift processing being performed on the second adjacent vehicle X2. Then, the target lateral position setting unit 14 determines whether or not the middle position travelling time is equal to or less than the travelling time threshold value (S212). In a case where the middle position travelling time is not equal to or less than the travelling time threshold value (NO in S212), the target lateral position setting unit 14 ends the shift processing on the first adjacent vehicle X1 in a case where the travelling direction distance between the host vehicle V and the first adjacent vehicle X1 becomes greater than the travelling direction threshold value a (S210). In a case where the middle position travelling time is equal to or less than the travelling time threshold value (YES in S212), the target lateral position setting unit 14 performs the processing tasks in S207 and subsequent thereto.

The present embodiment is configured as described above, in the state in which the first adjacent vehicle X1 and the second adjacent vehicle X2 are travelling in the adjacent lane R2 and in a case where the shift processing is performed on the first adjacent vehicle X1 when the host vehicle V overtakes the adjacent vehicle X, and when the distance between the second adjacent vehicle X2 and the first adjacent vehicle X1 is equal to or less than the vehicle-to-vehicle distance threshold value and the lane width direction distance between the second adjacent vehicle X2 and the travelling lane R1 of the host vehicle V is equal to or less than the lane width direction threshold value, the lane following control device 100 maintains the shift processing on the first adjacent vehicle X1 until the shift processing is performed on the second adjacent vehicle X2. That is, even when the host vehicle V overtakes the adjacent vehicle X1 and the travelling direction distance between the host vehicle V and the first adjacent vehicle X1 exceeds the travelling direction threshold value a, the lane following control device 100 does not return the target lateral position to the middle position. In this way, during the time from the shift processing performed on the first adjacent vehicle X1 to the shift processing performed on the second adjacent vehicle X2, the target lateral position of the host vehicle V is not returned to the middle position Rc. Therefore, the lane following control device 100 can suppress the lateral movement of the host vehicle V due to the returning of the target lateral position to the middle position Rc. Therefore, it is possible to suppress the uncomfortable feeling of the driver.

In the state in which the first adjacent vehicle X1 and the second adjacent vehicle X2 are travelling in the adjacent lane R2 and in a case where the shift processing is performed on the first adjacent vehicle X1 when the host vehicle V is overtaken by the adjacent vehicle X, when the distance between the second adjacent vehicle X2 and the first adjacent vehicle X1 is equal to or less than the vehicle-to-vehicle distance threshold value and when the lane width direction distance between the second adjacent vehicle X2 and the travelling lane R1 of the host vehicle V is equal to or less than the lane width direction threshold value, the lane following control device 100 maintains the shift processing on the first adjacent vehicle X1 until the shift processing is performed on the second adjacent vehicle X2. That is, even when the adjacent vehicle X1 overtakes the host vehicle V and the travelling direction distance between the host vehicle V and the first adjacent vehicle X1 exceeds the travelling direction threshold value a, the lane following control device 100 does not return the target lateral position to the middle position. In this way, during the time from the shift processing performed on the first adjacent vehicle X1 to the shift processing performed on the second adjacent vehicle X2, the target lateral position of the host vehicle V is not returned to the middle position Rc. Therefore, the lane following control device 100 can suppress the lateral movement of the host vehicle V due to the returning of the target lateral position to the middle position Rc. Therefore, it is possible to suppress the uncomfortable feeling of the driver.

In a case where the host vehicle V overtakes the first adjacent vehicle X1 and the second adjacent vehicle X2 or in a case where the host vehicle V is overtaken by the first adjacent vehicle X1 and the second adjacent vehicle X2, the target lateral position setting unit 14 calculates a middle position travelling time which is a duration from the time when the shift processing on the first adjacent vehicle X1 ends and the host vehicle V is returned to the middle position Rc to the time when the host vehicle V is separated again from the middle position Rc by the shift processing being performed on the second adjacent vehicle X2. When the middle position travelling time is equal to or less than a travelling time threshold value, the target lateral position setting unit 14 maintains the shift processing until the shift processing is performed on the second adjacent vehicle X2. In addition, when the relative speed between the host vehicle V and the second adjacent vehicle X2 is greater than the relative speed threshold value or when the relative distance between the host vehicle V and the second adjacent vehicle X2 is equal to or less than the relative distance threshold value, the target lateral position setting unit 14 maintains the shift processing on the first adjacent vehicle X1 until the shift processing is performed on the second adjacent vehicle X2.

Here, the case where the middle position travelling time is equal to or less than the travelling time threshold value, the case where the relative speed is greater than the relative speed threshold value, and the case where the relative distance is equal to or less than the relative distance threshold value mean a case where, after the shift processing on the first adjacent vehicle X1, the lateral position of the host vehicle V returns to the middle position Rc, and after a short time elapsed, the shift processing on the second adjacent vehicle X2 needs to be executed again. For this reason, even when the distance between the second adjacent vehicle X2 and the first adjacent vehicle X1 is greater than vehicle-to-vehicle distance threshold value, the target lateral position setting unit 14 maintains the shift processing on the first adjacent vehicle X1 until the shift processing is performed on the second adjacent vehicle X2 in a case where the middle position travelling time is equal to or less than the travelling time threshold value or the like. In this way, the lane following control device 100 can further suppress the lateral movement of the host vehicle V due to the returning of the target lateral position to the middle position Rc. Therefore, it is possible to further suppress the uncomfortable feeling of the driver.

The embodiment of the present invention is described as above, but the present invention is not limited to the embodiment described above. For example, when the relative speed between the host vehicle V and the second adjacent vehicle X2 becomes greater, the target lateral position setting unit 14 may use a larger value as the vehicle-to-vehicle distance threshold value which is a threshold value of the distance between the first adjacent vehicle X1 and the second adjacent vehicle X2. In a case where the relative speed between the host vehicle V and the second adjacent vehicle X2 is large, the host vehicle V and the second adjacent vehicle X2 approach each other in a short time. When the relative speed between the host vehicle V and the second adjacent vehicle X2 becomes greater, by increasing vehicle-to-vehicle distance threshold value, it is easy to perform the processing for maintaining the shift processing on the first adjacent vehicle X1 until the shift processing is performed on the second adjacent vehicle X2. In this way, the lane following control device 100 can further suppress the lateral movement of the host vehicle V due to the returning of the target lateral position to the middle position. Therefore, it is possible to further suppress the uncomfortable feeling of the driver.

The lane following control device 100 performs the shift processing based on whether or not the travelling direction distance between the adjacent vehicle X and the host vehicle V is equal to or less than the travelling direction threshold value a, but may perform the shift processing based on another reference. For example, the lane following control device 100 may perform the shift processing in a case where the host vehicle V enters a shift zone set around the adjacent vehicle X.

It is not always necessary to perform the processing tasks in S111 and S112 in FIG. 6. For example, in a case where the distance between the first adjacent vehicle X1 and the second adjacent vehicle X2 is not equal to or less than the travelling direction threshold value a (NO in S106), the target lateral position setting unit 14 may end the shift processing on the first adjacent vehicle X1 (S110). Similarly, it is not always necessary to perform the processing tasks in S211 and S212 in FIG. 7. For example, in a case where the distance between the first adjacent vehicle X1 and the second adjacent vehicle X2 is not equal to or less than the travelling direction threshold value a (NO in s206), the target lateral position setting unit 14 may end the shift processing on the first adjacent vehicle X1 (S210).

The target lateral position setting unit 14 in the embodiment makes the amount of shifting for shifting the target lateral position from the middle position Rc be same in the first adjacent vehicle X1 and the second adjacent vehicle X2. However, not limited to this, the target lateral position setting unit 14 may set the changed target lateral position T1 using the amount of shifting different from each other in the first adjacent vehicle X1 and the second adjacent vehicle X2. For example, the target lateral position setting unit 14 may change the amount of shifting according to the lateral positions of each of the first adjacent vehicle X1 and the second adjacent vehicle X2.

What is claimed is:

1. A lane following control device configured to control a travelling of a host vehicle such that the lateral position of the host vehicle becomes a target lateral position which is set at a middle position of a travelling lane, the device comprising:

an ECU configured to:

detect an adjacent vehicle travelling on an adjacent lane which is adjacent to the travelling lane of the host vehicle; and perform shift processing for shifting the target lateral position in the travelling lane from a middle position so as to be separated from the adjacent lane in response to a travelling direction distance between the adjacent vehicle detected by the ECU and the host vehicle being equal to or less than a travelling direction threshold value and a lane width direction distance between the adjacent vehicle detected by the ECU and the travelling lane of the host vehicle being equal to or less than a lane width direction threshold value; wherein the ECU controls the travelling of the host vehicle according to the target lateral position, and wherein, in response to the shift processing being performed on a first adjacent vehicle which is closest to the host vehicle among the adjacent vehicles detected by the ECU and travelling in front of the host vehicle, a travelling direction distance between a second adjacent vehicle travelling immediately front of the first adjacent vehicle in the adjacent lane and the first adjacent vehicle is equal to or less than a vehicle-to-vehicle distance threshold value, and a lane width direction distance between the second adjacent vehicle and the travelling lane of the host vehicle is equal to or less than the lane width direction threshold value, the ECU is configured to maintain the shift processing on the first adjacent vehicle until the shift processing is performed on the second adjacent vehicle.

2. The lane following control device according to claim 1, wherein, in response to the shift processing being performed on the first adjacent vehicle, and in a case where a distance between the second adjacent vehicle and the first adjacent vehicle is greater than the vehicle-to-vehicle distance threshold value and a lane width direction distance between the second adjacent vehicle and the travelling lane of the host vehicle is equal to or less than the lane width direction threshold value and a speed of the host vehicle is higher than a speed of the second adjacent vehicle, the ECU is configured to calculate a relative speed between the host vehicle and the second adjacent vehicle, a relative distance between the host vehicle and the second adjacent vehicle, or a middle position travelling time, which is a duration from the time when the shift processing on the first adjacent vehicle ends and the host vehicle is returned to the middle position to the time when the host vehicle is separated again from the middle position by the shift processing being performed on the second adjacent vehicle, and wherein, in response to the relative speed being greater than a relative speed threshold value, the relative distance is equal to or less than a relative distance threshold value, or the middle position travelling time is equal to or less than a travelling time threshold value, the ECU is configured to maintain the shift processing on the first adjacent vehicle until the shift processing is performed on the second adjacent vehicle.

3. The lane following control device according to claim 1, wherein, in response to the relative speed between the host vehicle and the second adjacent vehicle being greater, the vehicle-to-vehicle distance threshold value is set to be greater.

4. A lane following control device configured to control a travelling of a host vehicle such that the lateral position of the host vehicle becomes a target lateral position which is set at a middle position of a travelling lane, the device comprising:

an ECU configured to:

detect an adjacent vehicle travelling on an adjacent lane which is adjacent to the travelling lane of the host vehicle; and perform shift processing for shifting the target lateral position in the travelling lane from a middle position so as to be separated from the adjacent lane in response to a travelling direction distance between the adjacent vehicle detected by the ECU and the host vehicle being equal to or less than a travelling direction threshold value and a lane width direction distance between the adjacent vehicle detected by the ECU and the travelling lane of the host vehicle is equal to or less than a lane width direction threshold value;

wherein the ECU controls the travelling of the host vehicle according to the target lateral position, and wherein, in response to the shift processing being performed on a first adjacent vehicle which is closest to the host vehicle among the adjacent vehicles detected by the ECU and travelling behind the host vehicle, and a travelling direction distance between a second adjacent vehicle travelling immediately behind the first adjacent vehicle in the adjacent lane and the first adjacent vehicle is equal to or less than a vehicle-to-vehicle distance threshold value and when a lane width direction distance between the second adjacent vehicle and the travelling lane of the host vehicle is equal to or less than the lane width direction threshold value, the ECU is configured to maintain the shift processing on the first adjacent vehicle until the shift processing is performed on the second adjacent vehicle.

5. The lane following control device according to claim 4, wherein, in response to the shift processing being performed on the first adjacent vehicle, and a distance between the second adjacent vehicle and the first adjacent vehicle is greater than the vehicle-to-vehicle distance threshold value and a lane width direction distance between the second adjacent vehicle and the travelling lane of the host vehicle is equal to or less than the lane width direction threshold value and a speed of the host vehicle is lower than a speed of the second adjacent vehicle, the ECU is configured to calculate a relative speed between the host vehicle and the second adjacent vehicle, a relative distance between the host vehicle and the second adjacent vehicle, and a middle position travelling time which is a duration from the time when the shift processing on the first adjacent vehicle ends and the host vehicle is returned to the middle position to the time when the host vehicle is separated again from the middle position by the shift processing being performed on the second adjacent vehicle, and wherein, in response to the relative speed being greater than a relative speed threshold value, the relative distance is equal to or less than a relative distance threshold value, or the middle position travelling time is equal to or less than a travelling time threshold value, the ECU is configured to maintain the shift processing on the first adjacent vehicle until the shift processing is performed on the second adjacent vehicle.

* * * * *